(12) United States Patent
Akelbein et al.

(10) Patent No.: US 7,930,265 B2
(45) Date of Patent: Apr. 19, 2011

(54) METHOD FOR THRESHOLD MIGRATION BASED ON FUZZY LOGIC TRIGGERS

(75) Inventors: Jens-Peter Akelbein, Bodenheim (DE); Jens Fauth, Wiesbaden (DE)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 11/970,096

(22) Filed: Jan. 7, 2008

(65) Prior Publication Data

US 2008/0183642 A1    Jul. 31, 2008

(30) Foreign Application Priority Data

Jan. 8, 2007   (EP) .................................. 07100196

(51) Int. Cl.
*G06F 9/44* (2006.01)
*G06N 7/02* (2006.01)
*G06N 7/06* (2006.01)
*G06F 15/18* (2006.01)

(52) U.S. Cl. ............................................. 706/52; 706/1
(58) Field of Classification Search ...................... 706/52
See application file for complete search history.

(56) References Cited

U.S. PATENT DOCUMENTS 7,284,043 B2 * 10/2007 Feinleib et al. ................ 709/220
7,805,721 B2 *  9/2010 Feinleib et al. ................ 717/174

OTHER PUBLICATIONS

A new approach for fuzzy clustering of Web documents Friedman, M.; Last, M.; Zaafrany, O.; Schneider, M.; Kandel, A.; Fuzzy Systems, 2004. Proceedings. 2004 IEEE International Conference on vol. 1 Digital Object Identifier: 10.1109/FUZZY.2004.1375752 Publication Year: 2004 , pp. 377-381 vol. 1.*
A fuzzy-based algorithm for Web document clustering Friedman, M.; Kandel, A.; Schneider, M.; Last, M.; Shapira, B.; Elovici, Y.; Zaafrany, O.; Fuzzy Information, 2004. Processing NAFIPS '04. IEEE Annual Meeting of the vol. 2 Digital Object Identifier: 10.1109/NAFIPS.2004.1337355 Publication Year: 2004 , pp. 524-527 vol. 2.*
Upper and lower bounds on the number of fuzzy/c switching functions Tatsumi, H.; Araki, T.; Mukaidono, M.; Tokumasu, S.; Multiple-Valued Logic, 1998. Proceedings. 1998 28th IEEE International Symposium on Digital Object Identifier: 10.1109/ISMVL.1998.679473 Publication Year: 1998 , pp. 297-303.*
Quasi fuzzy paths in semantic network Abdus Salam, M.; Fuzzy Systems, 2001. The 10th IEEE International Conference on vol. 3 Digital Object Identifier: 10.1109/FUZZ.2001.1008862 Publication Year: 2001 , pp. 1164-1166.*

* cited by examiner

*Primary Examiner* — Michael Holmes
(74) *Attorney, Agent, or Firm* — Stephen J. Walder, Jr.; Jeffrey S. LaBaw

(57) ABSTRACT

Automigration mechanisms having fuzzy-logic based automigration control mechanisms for implementing control schemes controlling start, stop and/or bandwidth of the automigration process are provided. The automigration control mechanisms read, into a memory of an automigration controller circuit, configuration parameters characterizing the hardware and software properties of the source storage and target storage, and that of the network connection between them. The mechanisms further derive fuzzy variables from the values of the input variables and of the configuration parameters. The mechanisms further provide a predetermined fuzzy function with the fuzzy variables, where the fuzzy function reflects the exhaustion level of the source executing the fuzzy function yielding a fuzzy result value. The mechanisms apply the fuzzy result value to one of the control schemes, yielding a control result. The mechanisms control the start, stop, and/or bandwidth of the automigration of data by aid of the control result.

20 Claims, 20 Drawing Sheets

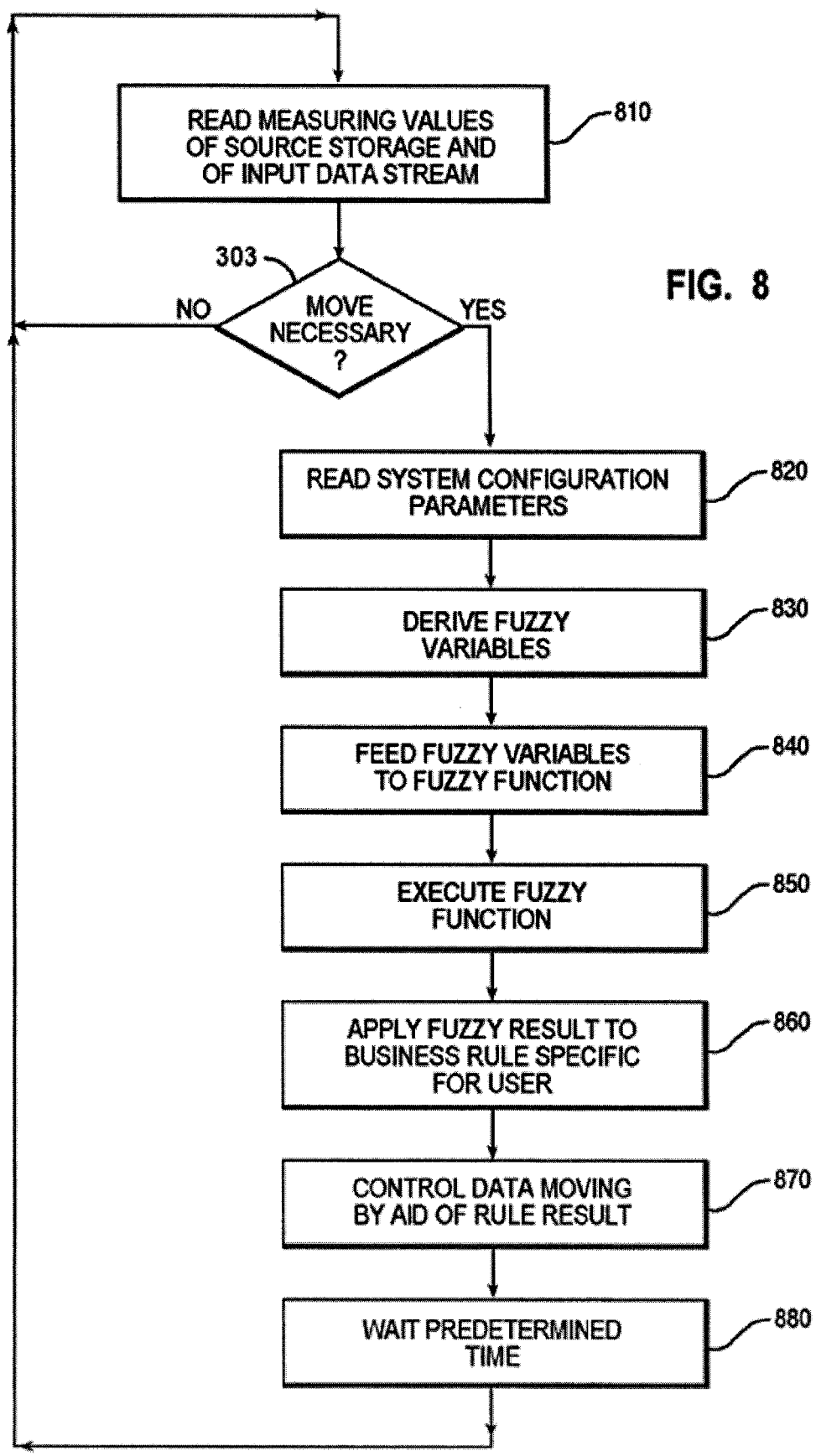

```xml
<AutomigrationControl1Unit>
    <!-- Name of the filesystem -->
    <!-- Each Filesystem has it's own Control1Unit -->
    <Filesystem>/mfs1</Filesystem>
    <!-- Configuration of the filesystem -->
    <Configuration>
        <Parameter name="MaxMigrators">
            <Value type="int">4</Value>
            <!-- Maximum number of available Tape-Drives -->
        </Parameter>
        <Parameter name="SpeedPerMigrator">
            <Value type="int">80</Value>
            <!-- Maximum speed of on Tape-Drive in MB/s -->
        </Parameter>
        <Parameter name="MaxFileSystemCapacity">
            <Value type="int">1000</Value>
            <!-- Size of the Filesystem in GB -->
        </Parameter>
    </Configuration>
    <!-- Variable input for each iteration -->
    <InputParameter>
        <Parameter name="FileSystemCapacity">
            <Value type="int" />
        </Parameter>
        <Parameter name="CapacityChange">
```

FIG. 9A

```
        </Definition>
        <Definition point="3">
            <Value type="int">50</Value>
            <Result type="double">0.0</Result>
        </Definition>
    </Field>
    <Field name="med">
        <Definition point="1">
            <Value type="int">30</Value>
            <Result type="double">0.0</Result>
        </Definition>
        <Definition point="2">
            <Value type="int">50</Value>
            <Result type="double">1.0</Result>
        </Definition>
        <Definition point="3">
            <Value type="int">60</Value>
            <Result type="double">1.0</Result>
        </Definition>
        <Definition point="4">
            <Value type="int">80</Value>
            <Result type="double">0.0</Result>
        </Definition>
    </Field>
```

FIG. 9C

```xml
<Field name="high">
    <Definition point="1">
        <Value type="int">60</Value>
        <Result type="double">0.0</Result>
    </Definition>
    <Definition point="2">
        <Value type="int">80</Value>
        <Result type="double">1.0</Result>
    </Definition>
    <Definition point="3">
        <Value type="int">100</Value>
        <Result type="double">1.0</Result>
    </Definition>
</Field>
</Function>
<!-- More functions for Capacity change and the Speed -->
</FuzzyFunctions>
<FuzzyOperators>
<Operator name="SimpleAdd">
    <Parameter name="Value1">
        <Value type="double" />
    </Parameter>
```

FIG. 9D

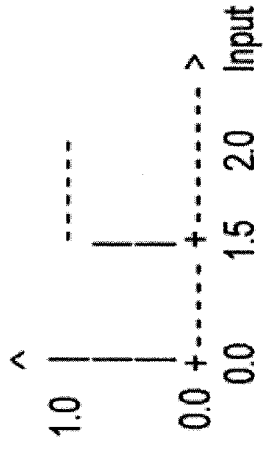

```
<Parameter name="Value2">
    <Value type="double" />
</Parameter>
<Operation name="add">+</Operation>
<ResultConversion >
<!--
```

Is the result of the addition greater than 1.5 the result is 1.0

This is not a simple add, it is more like the combination of two values. And if a specific threshold is reached the result is triggered.

```
-->
<Definition point ="1">
    <Value type="double">0.0</Value>
    <Result type="double">0.0</Result>
```

FIG. 9E

```
        </Definition>
        <Definition point="2">
            <Value type="double">1.0</Value>
            <Result type="double">0.0</Result>
        </Definition>
        <Definition point="3">
            <Value type="double">1.5</Value>
            <Result type="double">1.0</Result>
        </Definition>
        <Definition point="4">
            <Value type="double">2.0</Value>
            <Result type="double">1.0</Result>
        </Definition>
    </ResultConversion>
</Operator>
<Operator name="KomplexAnd"
<!--
The purpose of the KomplexAnd is it to combine results, so that
low  + low   is low
low  + med   is low
med  + med   is med
med  + high  is med
high + high  is high
```

FIG. 9F

```
-->
<Convert>
    <Field name="low">
        <Definition point="1">
            <input type="int">0</Value>
        </Definition>
        <Definition point="2">
            <input type="int">30</Value>
        </Definition>
        <Definition point="3">
            <input type="int">50</Value>
        </Definition>
        <Result type="string">low<Result>
    </Field>
    <Field name="med">
        <Definition point="1">
            <input type="int">30</Value>
        </Definition>
        <Definition point="2">
            <input type="int">50</Value>
        </Definition>
        <Definition point="3">
            <input type="int">60</Value>
        </Definition>
```

FIG. 9G

```
                                    <Definition point="4">
                                        <input type="int">80</Value>
                                <Definition>
                                <Result type="string">med<Result>
                        </Field>
                        <Field name="high">
                                <Definition point="1">
                                        <input type="int">60</Value>
                                </Definition>
                                <Definition point="2">
                                        <input type="int">80</Value>
                                </Definition>
                                <Definition point="3">
                                        <input type="int">100</Value>
                                </Definition>
                                <Result type="string">high<Result>
                        </Field>
```

<Definition point="1">
                                                <input
                                        </Definition>
                                        <Definition point="2">
                                                <input <Field name="high"> type="int">60</Value>

FIG. 9H

```
                              H ─────────────────────────────────────────────────────── H
                              type="int">80</Value>
                        type="int">100</Value>
                                        </Definition>
                                        <Definition point="3">
                                                <input
                                        </Definition>
                                        <Result type="string">high</Result>
                                </Field>
                                <Parameter name="Value1">
                                        <Value type="double" />
                                        <Convert/>
                                </Parameter>
                                <Parameter name="Value2">
                                        <Value type="double" />
                                        <Convert>
                                </Parameter>
                                <Operation name="And">
                                        <if>
                                                <and>
                                                        <input
                                                        <input
                                                </and>
                              I ─────────────────────────────────────────────────────── I
select=" ../Parameter [ @name=Value1" ] " equal="low" />
select=" ../Parameter [ @name=Value2" ] " equal="low" />
```

FIG. 9I

```
            <Result type="string">low</Result>
          </Definition>
          <!-- some more <if> like the rules above -->
        <if>
      </Operator>
      <!-- More operators -->
      <Operator>
        ...
      </Operator>
      <!-- ... -->
    </FuzzyOperators>
    <Translators>
      <Translator name="MigrateOnOff">
        <Parameter name="Value">
          <Value type="double" />
        </Parameter>
        <Result name="ResultValue">
          <Value type="bool" default="false" />
          <Converter type="double" value="=>=1.0" result="true" />
        </Result>
      </Translator>
      <!-- Here are more Translators. For example one that translate
```

FIG. 9J

```
                                                        low, med, high into Values for the number of migrators.
          -->
        </Translators>
        <OutputOperators>
          <Parameter name="NumberOfNeededMigrators">
            <ResultValue type="int" min="0"
max="/Configuration/Parameter[@name='MaxMigrators']" />
          </Parameter>
          <Parameter name="RunMigration">
            <ResultValue type="bool" />
          </Parameter>
        </OutputOperators>
        <Controller>
          <Process>
            <Function name="1" select="/FuzzyFunctions/Function[@name ='Capacity'1">
              <input
select="/InputParameter/Parameter[@name ='FileSystemCapacity' ]" />
              <result name="CapacityValue" type="double" />
            </Function>
            <!--                    Processions of the other functions
            -->
          </Process>
        </Combine>
```

FIG. 9K

```
select="/Controller/Process/Function [ @name = ' 1 ' ] /result [@name=' CapacityValue ' ]"
        <Operator name="1" select="/FuzzyOperators/Operator[ @name ='SimpleAdd"1">
                <input
for="/FuzzyOperators/Operator [ @name = ' SimpleAdd ' ]/Parameter [@name =' Value1 ' ]" />
select="/Controller/Process/Function [ @name = ' 2 ' ] /result [@name=' CapacityValue ' ]"
                <input
for="/FuzzyOperators/Operator [ @name = ' SimpleAdd ' ] /Parameter [@name =' Value2 ' ]" />
                <result name=" CapacityResult" type="double" />
        </Operator>

<!--
the amount of migrators
        <Combine>
        <Results>
                Other operators
                For example, one that uses " KomplexAnd" to determine
                that are needed.
-->

Output select="/ OutputOperators/Parameter [ @name =' RunMigration ' ]" >
```

FIG. 9L

```
                                                              L
         L
select="/Translators/ Translator [@name=' MigrateOnOff' ]" >
                                <translate
select="/Controller/Combine/ Operator [ @name ='1' ] /result [@name=' CapacityResult' ]" />
                                                  <input
                                     </translate>
                   </Output>
                   <!--
                                             Other outputs
                                             For example, the output of the number of needed
migrators.
                                   -->
                         </Results>
             </Controller>
</AutomigrationControl1Unit>

FIG. 9M
```

METHOD FOR THRESHOLD MIGRATION BASED ON FUZZY LOGIC TRIGGERS

1. BACKGROUND OF THE INVENTION

1.1. Field of the Invention

The present invention relates to the field of electronic computing, and in particular to electronic storage management. More particularly, it relates to a method and respective system for migrating electronic data in a networked environment from a source storage to a target storage, wherein the migration of data is done in order to keep the source storage running below a predetermined exhaustion threshold.

1.2. Description and Disadvantages of Prior Art

Such prior art Hierarchical Storage Management (HSM) manages n-tier (above: n=2) storage hierarchies by migrating data within the hierarchy. Therefore, single data objects (files) are selected based on an eligibility criterion. Data migrations are triggered if a threshold of used capacity is reached. If the trigger event occurs a migration task migrates files as long as the used capacity within a file system is above a low threshold. When this threshold is reached no more files are being migrated. As the HSM system migrates the data without user or administrator interaction it is called automigration. To reduce the complexity of the setup a 2-tier storage hierarchy is used as an example. Nevertheless, the same scheme can be applied in multi-tier environments with migration of data from tier to tier in the hierarchy. The first tier is called "online storage" which is a locally attached or shared hard disk managed as a file system. The second tier is called nearline storage.

Typically a cheap disk or tape storage is being used as capacity in this tier.

An exemplary prior art storage management system is an IBM product called IBM Tivoli Storage Manager (TSM) for Space Management (TSM HSM). This prior art product implements the concept of so-called Hierarchical Space Management (HSM) as part of the TSM product family. FIG. 1 illustrates the basic architectural components of a prior art file server 10 which implements HSM in form of auto migration processes. The file server 10 comprises a file system 14 acting as online storage by means of some plurality of attached hard discs, a capacity monitoring unit 16 having the respective functional interface to the file system 14 in order to be able to monitor the occupied capacity of the file system 14, a control unit 18 controlling the auto migration processes triggered by a control signal generated in a capacity monitoring unit 16, and a near line storage 22 connected to the file server.

An input data stream 12 labeled "new data" enters into the file server 10, is stored within the file system 14, and a data output stream 20 is defined for data which is migrated from the file system 14 to the near line storage system 22.

TSM is using a client-server oriented architecture. The TSM server manages all nearline storage devices like disk areas or tape libraries where data gets stored for backup, archive, or HSM purposes. While the server is one central instance, multiple clients send data to the TSM server. Various types of clients implement backup, archival, or HSM for data like files or databases. TSM HSM manages local file systems with direct attached storage devices (DASD) or SAN-attached storage devices and their capacity by migrating file contents to the TSM server so that used storage can be released for these files. A placeholder called stub remains in the file system pointing to the data stored on Nearline storage.

The prior art automigration process gets started periodically when more storage capacity is being used.

FIG. 2 shows a sequence of automigration processes carried out due to new data put into along input data stream 12 into the storage system. A high threshold $T_H$ is set to 90% while a low threshold $T_L$ is set to 80%. In this example 10% of the online storage capacity $C_{Online}$ is being migrated. This amount of capacity $C_{Delta}=(T_H-T_L)*C_{Online}$ varies only on a very limited level depending on the size of the files being migrated at that point in time when the low threshold is reached. Depending on the distribution of file sizes the number of data objects being migrated may vary significantly. FIG. 2 shows that continuous data growth leads to periodic automigrations. A fixed amount of storage capacity is migrated to the next storage tier.

FIG. 3 shows a file system distribution often found on file servers. A typical distribution of file sizes can vary in a wide range. One typical distribution being found on file servers is a logarithmic dependency between file size and number of files of the same size. Such file servers contain only a small number of large files while the majority of files are small ones. Only a small amount of files is required for being migrated to reach the low threshold. In this case only a small number of large files will be migrated. In another scenario where also smaller files are marked by the migration policy as being eligible for migration and get selected the number of objects can become significantly higher compared to the first scenario.

The prior art implementation of the automigration process of the prior art IBM Tivoli Storage Manager for Space Management (TSM/HSM) configures the I/O bandwidth being used between online storage 14 and Nearline storage 22 statically, i.e. independently of current file system workload. The number of parallel processes carrying out data migrations from storage 14 is defined by a parameter MAXMIGRATORS. Each migration process opens its own session to the TSM server, which manages the Nearline storage. A session is used for transferring data in one stream so only one file per session is migrated. By having multiple migrations processes and the equivalent amount of open sessions, the same number of files are migrated in parallel. Only if the data should be written directly on tape and not enough tape drives are available less files are migrated in parallel. If the sessions have to share I/O path resources the throughput for a single file migration will be reduced. Prior art automigration uses all available resources assigned to it. So during an automigration all resources are occupied while in the time between two automigrations no data is being transferred. This can disadvantageously lead to performance degradation of the system if the value of MAXMIGRATORS is chosen too high. If all the data migrations carried out in parallel have to share the same I/O path the available bandwidth for a single session becomes less. Tape drives, especially using Linear Tape Open (LTO) as a media type technology, require a minimum data rate. If too less data is sent to the tape drive it has to stop writing and buffer data until the next chunk can be written to tape. If the tape stops it has to rewind the tape media to synchronize continued tape writes with the format written in the previous operation. This behaviour leads disadvantageously to significant write performance degradation if the throughput decreases under a certain threshold. This non-linear behaviour between I/O throughput and write performance is specific for tape drives.

Prior art automigration itself is driven by thresholds defined beforehand based on the capacity of the online storage 14. A high threshold $T_H$ defines the trigger for starting automigration while a low threshold $T_L$ is the trigger to stop automigration.

This concept of static thresholds disadvantageously does not allow changing these settings based on the current status of the storage system. So, independently of a low or high volume of new data stored within the storage system the automigration uses the same I/O bandwidth to the nearline storage 22.

On the other hand, it is basically very difficult, to setup a migration control method based on more than the consumed capacity of storage system 14, as the influence of each input variable needs to be evaluated in the overall context. This, however, is difficult to model fine enough due to the complexity of storage solutions. For example, a harddisk drive is a complex rotary system, having very complex system properties and time behaviour. Also a bus connecting between CPU or memory and hard disk storage is very difficult to model, as the bus load is quite volatile over time.

1.3. Objectives of the Invention

The objective of the present invention is to provide an improved migration control method and system.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the present invention, a dedicated, fuzzy-logic based auto migration control logic is provided allowing implementing various schemes of how automigration is started, stopped or modified, and how many target resources are used for it.

According to the invention, the introduction of a dedicated control unit uses fuzzy functions operating on a plurality of input variables. That enables migration implementations to be configured and become adaptive to various situations reflecting how the Online storage 14 device is currently being used.

Such automigration control logic might use the following input variables to generate its output:

The derivative function $C'_o(t)$ of current allocated Online capacity $C_o(t)$ allows to detect how much new data is currently being added to managed file system in a certain amount of time.

The 2nd derivative function $C''_o(t)$ of current allocated Online capacity allows to detect variations in the rate of how much new data is currently being added to the managed file system.

The current allocated Nearline capacity $C_n(t)$ allows to determine $R_{n/o} = C_n(t)/C_o(t)$ ratio which is an indicator of how HSM is used to manage the file system (adding a small amount of additional capacity for avoiding out-of-space conditions vs. archival repositories on Nearline storage where the file system is used as a file cache).

The derivative function of current Nearline storage $C'_n(t)$ allows to monitor the current growth rate of the data being stored on the Nearline storage Current amount of data $C_{in}(t)$ moved into the Online storage and $C_{out}(t)$ moved out of the Online storage resp. currently being deleted Current capacity being moved from Online to Nearline storage $C_{o\to n}(t)$ and vice versa $C_{n\to o}(t)$ The current time t can be used for defining preferred daily windows for data movements. This allows to perform migration jobs in a time frame where no other job occupies bandwidth to Nearline storage Capacity information per storage pool Other parameters qualifying the attributes of objects (files and directories) contained in the file system like object creation and deletion rates, average age and/or size of objects within the file systems, system and user quotas, type of data contained in objects (association to applications) and other parameters known as being relevant for information lifecycle management (ILM).

In addition to input variables the hardware and software configuration itself is advantageously gathered as additional information for use by the control unit in order to manage the automigration process appropriately. Suited hardware and software configuration parameters are:

The total amount of Online and Nearline capacity $C_{o,max}$ and $C_{n,max}$,

The maximum bandwidth the I/O path to the Online storage which defines how much new data can be put into the Online storage (sustained data rate to Online storage), The maximum bandwidth of the I/O path between Online and Nearline storage that defines how much data can be moved off the Online to the Nearline storage (sustained data rate to Nearline storage), The maximum number of storage resources which can be used by automigration i.e. the number of tape drives, The maximum bandwidth of a single storage resource i.e. the maximum write performance of a tape drive, The maximum bandwidth of the I/O path between Online and Nearline storage that can be used for moving data back from Nearline to Online storage. This parameter is of interest when the same I/O path is used for both directions of data movements, Historical data of the HSM managed file system usage i.e. the maximum amount of data ever written in the past to Online storage in a certain amount of time if it is less than the sustained data rate to Online storage.

The output variables of the control unit are still start and stop triggers for the inventionally controlled automigration process. Another output variable is resource utilization (MAXMIGRATORS) of the automigration process that is not statically defined anymore.

According to the present invention the following steps are performed, preferably by or at least controlled by a fuzzy-logic based automigration control implementing control schemes controlling start, stop and/or bandwidth of the automigration process:

a) reading (810, 820) into a memory of an automigration controller circuit configuration parameters characterizing the hardware and software properties of said source (14) and said target storage means (22), and that of the network connection between them, b) deriving (830) fuzzy variables from said values of said input variables and of said configuration parameters, c) feeding (840) a predetermined fuzzy function with said fuzzy variables, wherein said fuzzy function reflects the exhaustion level of the source (14), d) executing (850) said fuzzy function yielding a fuzzy result value, e) applying (860) said fuzzy result value to one of said control schemes, yielding a control result, f) controlling (870) start, stop, and/or bandwidth of said automigration (20) of data by aid of said control result.

The method according to the present invention can be advantageously applied in the field of backups, also. In this respect, instead of moving data from online to nearline storage for migration purposes a backup implies copying the data from online to nearline storage. As Enterprise-wide backup applications typically backup more than one instance of online storage, e.g. a plurality of 2000 PC harddisks, wherein each harddisk corresponds to a single instance, a coordination of multiple backups is necessary.

Thus, different backup instances usually have different backup priorities. For example, a backup of a business-critical database should be carried out with a higher priority than a backup of a Personal Workstation. The priority of a backup instance out of a plurality of instances will thus be included as an input into the computations of the Fuzzy Logic. In addition, a backup can be initiated manually, where all input variables being mentioned above can be utilized by a respective inventional Fuzzy controller, while a start trigger is not needed. As backups ends automatically after completion an end trigger is not needed, neither for automatic nor for manual backups.

The method according to the present invention can be further advantageously applied in the field of archiving, also. In this respect, the inventional method is applicable for archivals. So, an input variable for prioritizing archivals by the type of data being archived can be applied. Similar to backups, the start trigger is only required for automatically started archivals and no end trigger is needed.

3. BRIEF DESCRIPTION OF THE DRAWINGS

The present invention is illustrated by way of example and is not limited by the shape of the figures of the drawings in which:

FIG. 8 illustrates the control flow of the intentional automigration control method according to a preferred embodiment, and FIGS. 9A to 9M illustrate some fuzzy functions and some fuzzy operators implemented in exemplarily XML code.

4. DETAILED DESCRIPTION OF THE PREFERRED EMBODIMENT

Figure 1:
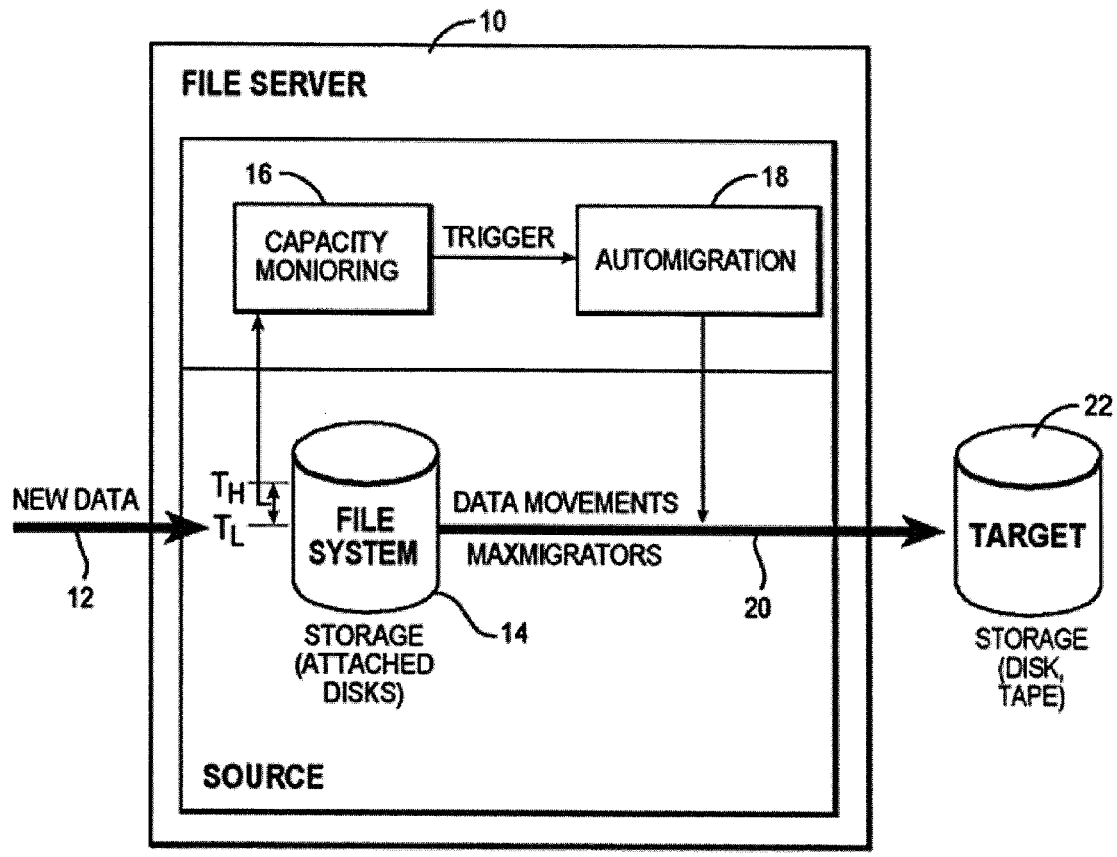
FIG. 1 illustrates the most basic structural components of a prior art hardware and software environment used for a prior art migration method.
Figure 3:
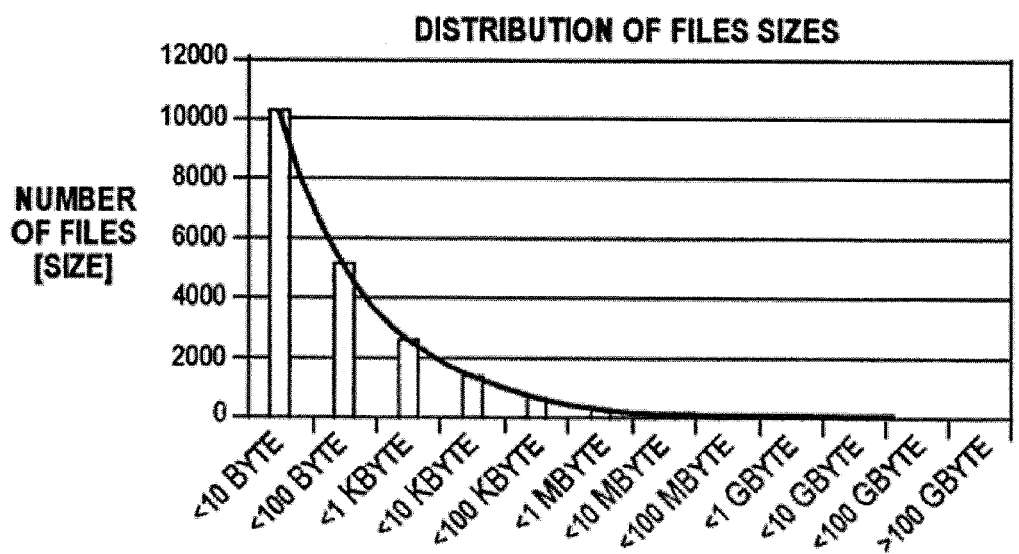
FIG. 3 is a depiction number of files over file size, thus revealing a typical file size distribution curve.
Figure 2:
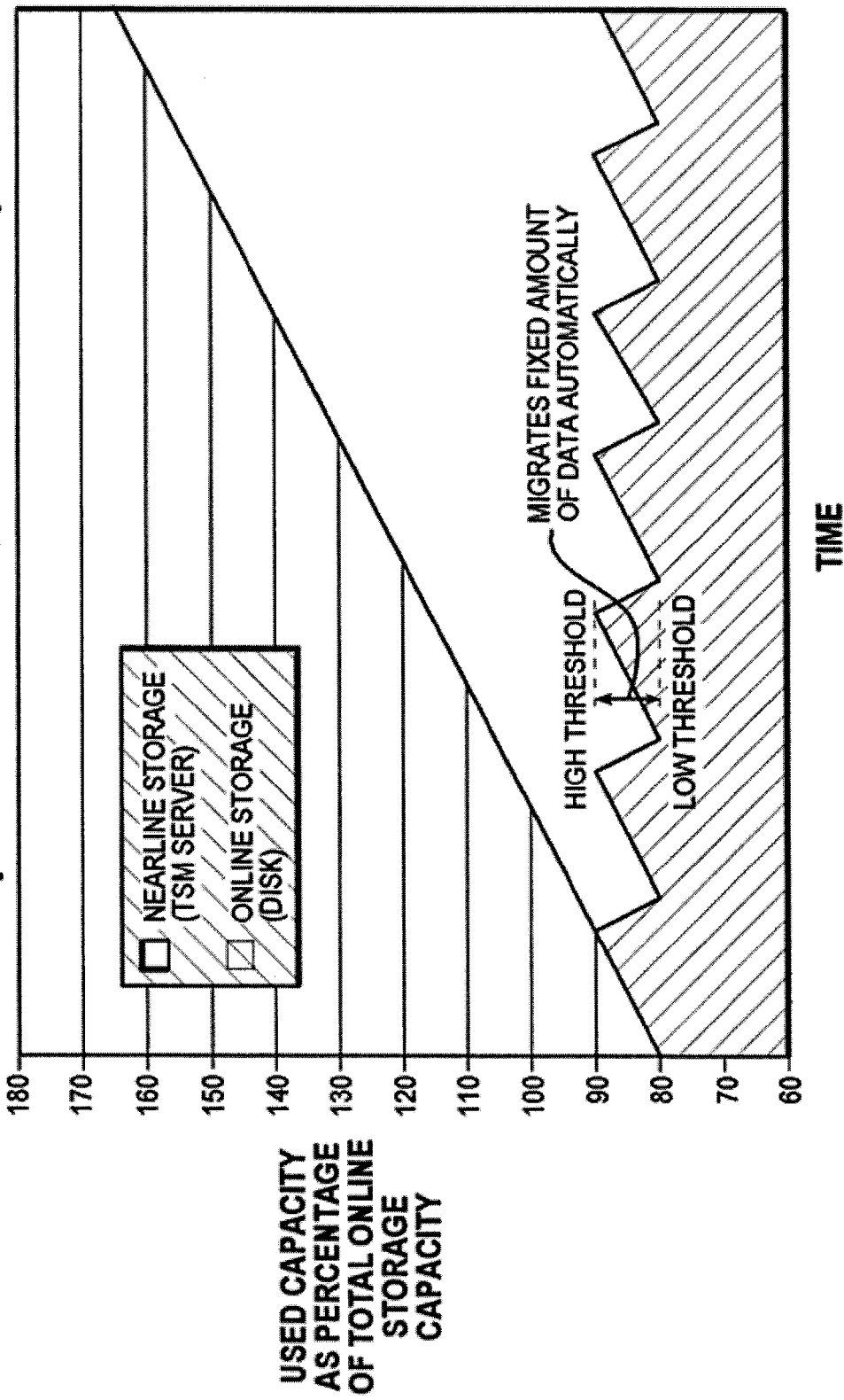
FIG. 2 is a depiction of the used capacity of the total source storage capacity over time. The prior art implemented control results in a saw-tooth like migration pattern as visible in the bottom part of the figure.
Figure 4:
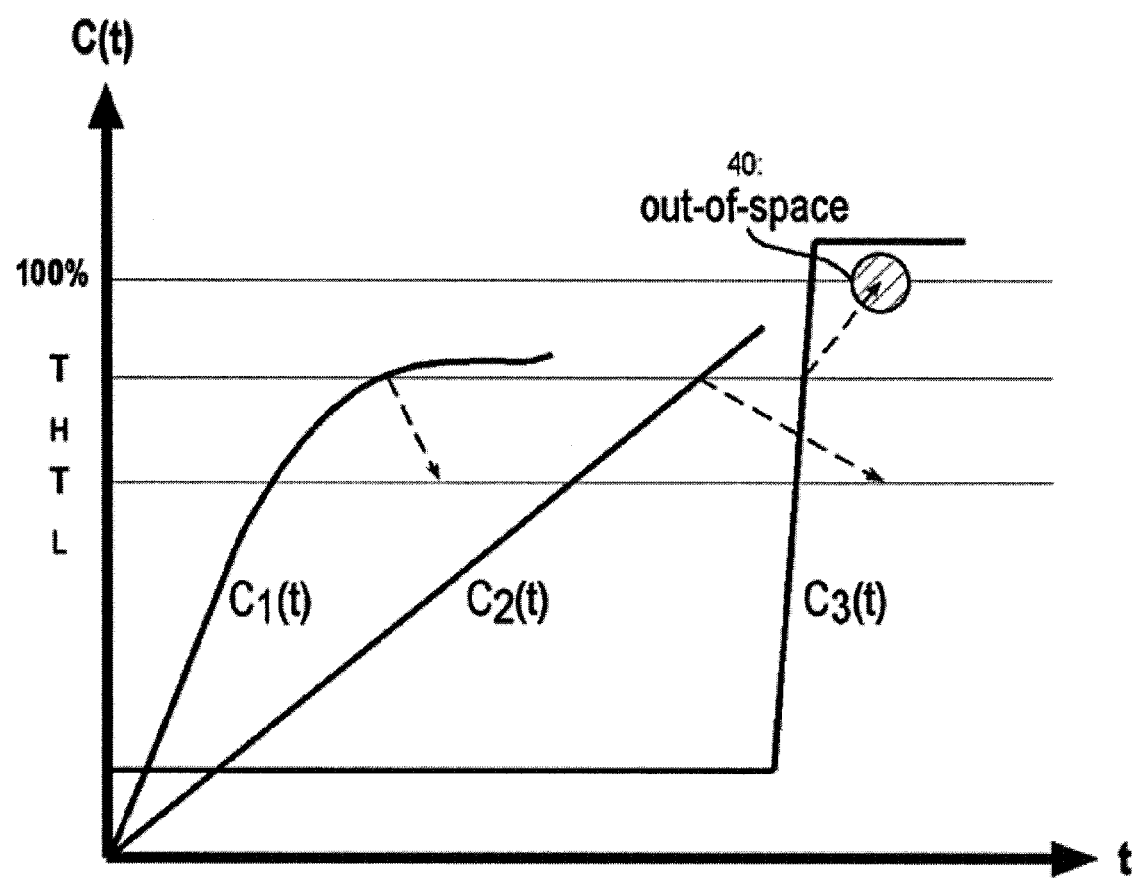
FIG. 4 is a depiction of the used capacity C of the source storage system overtime, revealing three different scenarios of filling up the capacity, wherein the capacity changes obtained by migrating the data are shown as dotted arrows.
Figure 5:
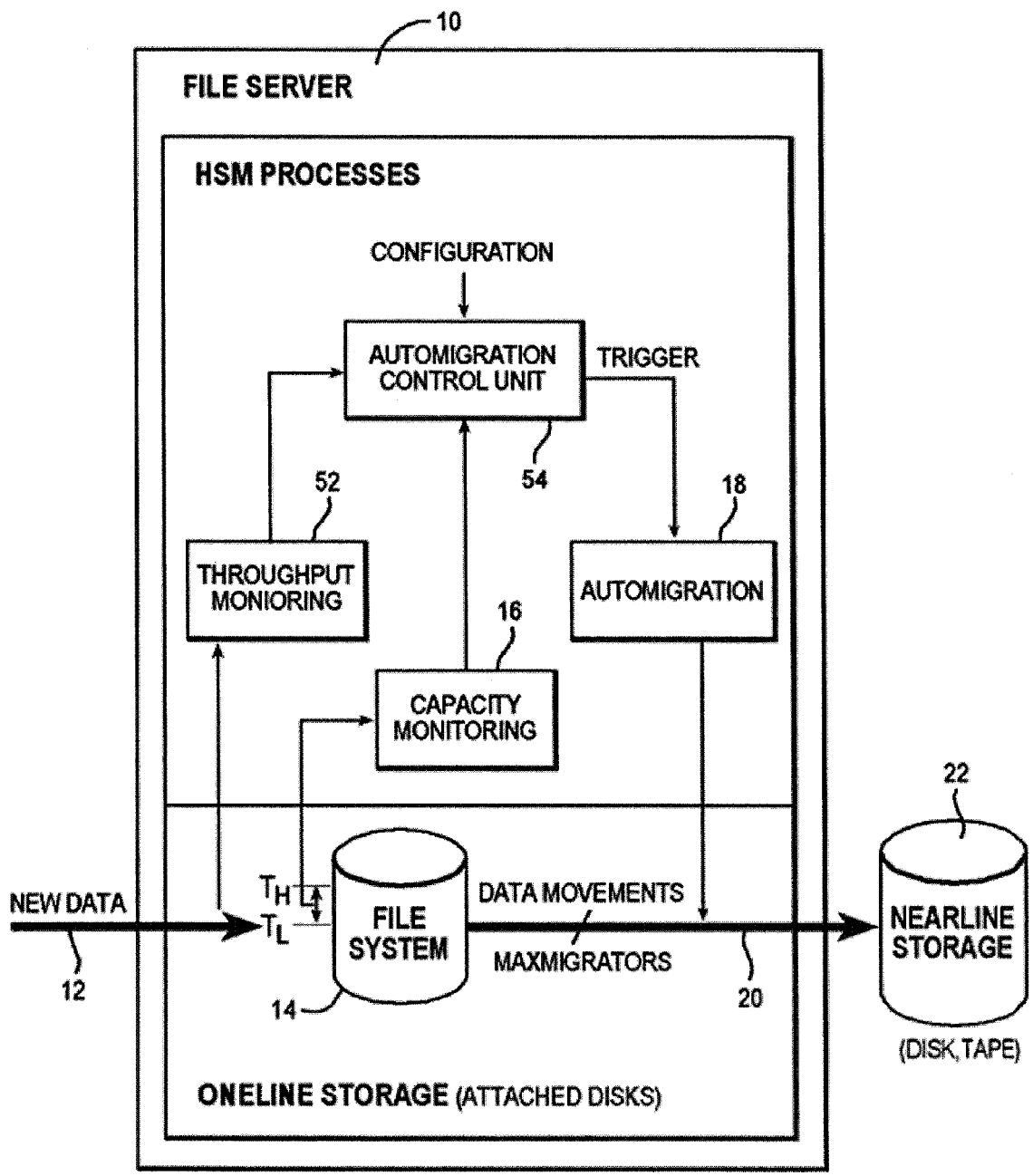
FIG. 5 illustrates the most basic structural components of an inventional hardware and software environment used for a preferred embodiment of the inventional method.

With general reference to the figures and with special reference now to FIG. 5 an inventional auto migration control unit 54 is provided which comprises functional interfaces to a throughput monitoring unit 52 and to the capacity monitoring unit 16 already known in prior art. The inventional throughput monitoring unit 52 comprises sensor interfaces to the input bus 12 connecting to the source storage system 14 (file system). Over these interfaces the current rate of data to be stored in the source storage system is measured. Those measured values are fed into the auto migration control unit 54. The capacity monitoring unit is basically implemented as it is known from prior art.

Further, according to this preferred embodiment a plurality of configuration parameters is stored in a configuration file 56 which is accessible for a read process by control unit 54. In this configuration file a list of descriptive parameters are stored describing the hardware and software configuration of the file server in any level of detail desired. Exemplary parameters are already mentioned further above.

As the skilled reader may appreciate, the inventional auto migration control unit processes the inventional input information from blocks 52, 16 and 56 and generates the control signals used for controlling the migration process.

Figure 6:
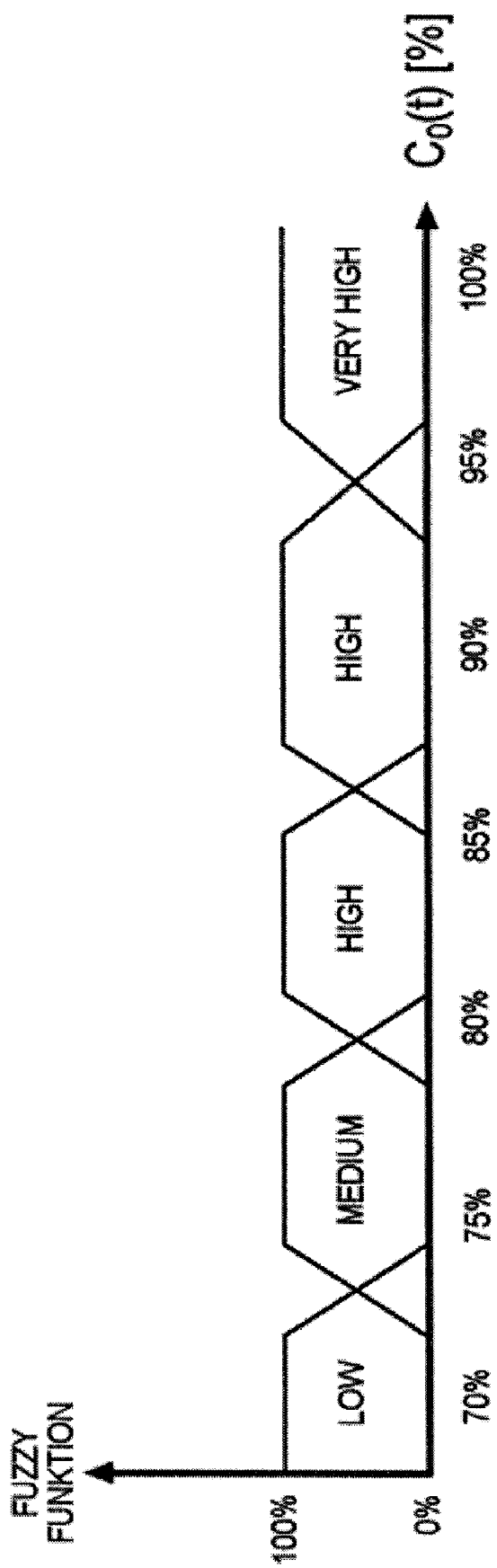
FIG. 6 illustrates an example of a fuzzy function for the source storage file system capacity C0 (T).

As FIG. 6 shows, the inventional use of Fuzzy-logic transforms the input variables as discussed above into fuzzy variables by using a set of fuzzy functions. The function values thereof represent the probability of a classification into a given number of pre-defined categories. For example the used capacity of the source storage system can be divisioned into four different categories which are able to be described in fuzzy values of:

low, medium, high, quite high or very high.

These categories are associated with input parameter ranges by using the fuzzy function on the current value of the input variable. Optionally, those ranges overlap to some degree, which may easily include a trend.

The fuzzy function transforms the value into a probability for each category. According to the invention fuzzy functions are used to process the various types of input variables listed above. Depending on the requirements of an actual use case an appropriate selection of input variables should be chosen for defining the automigration controller. The Fuzzy-Set Theory provides operators like AND, OR, NOT similar to the Boolean logic. These logical operators are used to define the controller logic to generate its output side.

Figure 7:
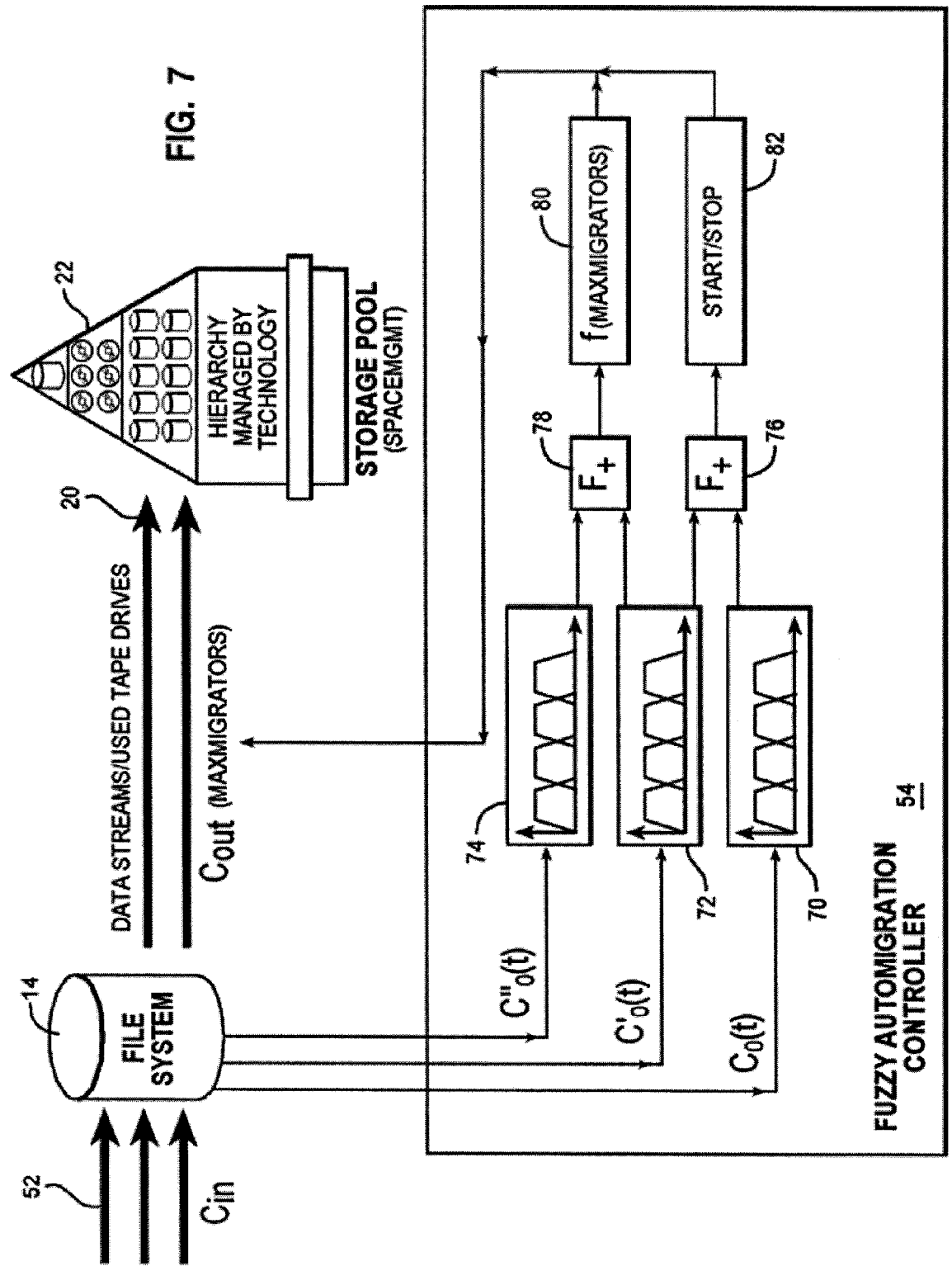
FIG. 7 is a schematic depiction illustrating further details of the auto migration control unit 54 depicted in FIG. 5.
Figure 9B:

FIG. 7 illustrates some details of box 54 in FIG. 5. FIG. 8 shows a typical control flow of an inventional fuzzy automigration controller.

Fuzzy functions 70, 72, 74 are provided in advance, before starting the runtime control. They are constructed based on expert knowledge, when an input value has to be seen as low, medium, high, or very high as an example for four categories only.

In an exemplary embodiment the following input variables are used:

$C_o(t)$
$C_o'(t)$, and
$C_o''(t)$, as defined further above.

During runtime, these input variables
$C_o(t)$, $C_o'(t)$, and $C_o''(t)$ are measured via the sensing interface, see also step 810 in FIG. 8.

Then, a decision 815 determines, if a data migration is necessary or not. If necessary, the remaining system configuration parameters are read from the configuration file 56, step 820. In a next step 830, these input variables are processed according to a set of predetermined algorithms, in order to derive fuzzy values which reflect the current situation in an adequate way.

For example, the situation could be characterized by: Capacity C is "High", trend C' is "capacity decrease", speed of decrease C" is "significant".

Then in a step 840 the values of the fuzzy variables are fed to a fuzzy function processing preferably the totality of them. The fuzzy function is then executed, step 850, and the result thereof is applied to a use case specific control scheme implementing some use case specific business rule, step 860.

Then, for example, an OR operator ($F_+$) can be used for creating the start/stop trigger out of $C_o(t)$ and $C_o'(t)$, while the throughput control is using $C_o'(t)$ and $C_o''(t)$. An exemplary algorithm could be:

If C is very high OR C' is decrease, and C" is significant, then select "many" migration paths.

Remark that even the parameter maxmigrator can be expressed in fuzzy way. Thus, depending of the values of further parameters of the system environment, "many" paths may mean a number of five or six (whatever, as the numbers can be willingly selected), and in other situations a number of only three parallel migration paths.

Then, a start/stop trigger function converts the fuzzy value into a Boolean (True, False), which is needed to implement the actual control, i.e. to generate a control signal to start or to stop the migration process, step 870.

Preferably, a function f (MAXMIGRATORS) converts a fuzzy value into an integer number representing the number of drives being used as migration targets.

The parameter space used for orchestrating the fuzzy calculations is preferably stored as a controller "layout" in a configuration file 56 rather than defined fixedly. This allows changing the controller and its logic quite easily. This is especially helpful for providing a set of layouts of the controller for different usage scenarios. An administrator has then just to select how the target storage system is used.

It should be added that an application such as using the target storage as a disk extension for buffering data differs significantly from other scenarios like archive repositories with online access to the contained data through the file system interface. Each of the known usage scenarios can be controlled by a different automigration controller with its own, specific layout. The description of the layout can be carried out in various formats, preferably XML.

FIGS. 9A-9M disclose an XML code example for an example of:
a fuzzy function "Capacity",
a fuzzy Operator "simpleadd",
another fuzzy operator "KomplexAnd",
another operator "Translator",
another operator "Output Controller",
and another operator "Controller".

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for automigrating electronic data in a networked environment from a source storage device to a target storage device, comprising:
   reading, into a memory of an automigration controller, configuration parameters characterizing at least one of hardware or software properties of the source storage device, the target storage device, and a network connection between, the source storage device and the target storage device;
   deriving fuzzy variables from values of the configuration parameters;
   feeding a predetermined fuzzy function with the fuzzy variables, wherein the fuzzy function reflects the exhaustion level of the source;
   executing the fuzzy function yielding a fuzzy result value;
   applying the fuzzy result value to a control scheme, yielding a control result; and
   controlling at least one of start, stop, or bandwidth of automigration of data based on the control result.

2. The method according to claim 1, wherein reading configuration parameters comprises:
   reading at least one value of a group of input variables comprising at least one of:
   the source storage device's storage capacity currently in use,
   the source storage device's increase of used storage capacity,
   the source storage device's velocity of used storage capacity increase,
   the target storage device's storage capacity currently in use,
   the target storage device's increase of used storage capacity,
   the target storage device's velocity of used storage capacity increase,
   a current time,
   a current day of week,
   attributes of data objects to be migrated,
   deletion rates of a source storage system,
   creation rates of a target storage system,
   average age of data objects to be migrated,
   system quota,
   user quota, or
   information about an origin or use of data to be migrated.

3. The method according to claim 1, wherein the target storage device is used in relation to the source storage device as one of:

a backup system, a long-term archive system, a cooperating storage system of a same type as a source storage system, or an element of a storage pool, of which the source storage system is also an element.

4. The method according to claim 1, wherein controlling at least one of start, stop, or bandwidth of automigrating data includes determining a bandwidth of the migrating process by defining a number of target systems used in parallel.

5. The method of claim 1, wherein the configuration parameters comprise at least one of:

a total amount of online and nearline capacity;

a maximum bandwidth of an associated input/output path;

a maximum number of associated storage resources which can be used for automigrating electronic data;

a maximum bandwidth of a single associated storage resource; and historical data of file system usage indicating a maximum amount of data ever written in the past in a certain amount of time.

6. The method of claim 1, wherein deriving fuzzy variables from values of the configuration parameters comprises associating ranges of values of the configuration parameters with categories of the fuzzy variables, and wherein the fuzzy function transforms fuzzy variables into a probability for each category in the categories.

7. The method of claim 1, further comprising:

sensing one or more input parameter values using sensors of a throughput monitoring mechanism coupled to an input bus of a source storage system, wherein the one or more input parameter values represent a data throughput of at least one of the source storage system or a target storage system, and wherein the fuzzy variables are further derived based on the one or more input parameter values.

8. The method of claim 1, further comprising:

determining, based on the one or more input parameter values, whether the automigration of electronic data is to be performed, wherein reading, deriving, feeding, executing, applying, and controlling are performed in response to a determination that automigration of electronic data is to be performed based on the one or more input parameter values.

9. The method of claim 1, wherein executing the fuzzy function comprises executing a plurality of fuzzy functions, each fuzzy function providing a different fuzzy result value, and wherein at least one OR operator is applied to the different fuzzy result values to generate a single fuzzy result that is input to a start/stop trigger function.

10. The method of claim 9, wherein the start/stop trigger function generates the control result which is converted to a control signal to either start or stop the automigration of the electronic data.

11. The method of claim 1, wherein a configuration of the automigration controller is stored in a configuration file, wherein the configuration of the automigration controller is for a specific usage scenario, and wherein the configuration of the automigration controller configures the logic of the automigration controller to customize the logic for implementing the specific usage scenario.

12. The method of claim 11, wherein there are a plurality of configuration files for configuring the automigration controller and wherein a desired configuration file for configuring the logic of the automigration controller is selected for a desired usage scenario.

13. A computer program product comprising a computer recordable medium having a computer readable program recorded thereon, wherein the computer readable program, when executed on a computing device, causes the computing device to:

read, into a memory of an automigration controller, configuration parameters characterizing at least one of hardware or software properties of the source storage device, the target storage device, and a network connection between the source storage device and the target storage device;

derive fuzzy variables from values of the configuration parameters;

feed a predetermined fuzzy function with the fuzzy variables, wherein the fuzzy function reflects the exhaustion level of the source;

execute the fuzzy function yielding a fuzzy result value;

apply the fuzzy result value to a control scheme, yielding a control result; and control at least one of start, stop, or bandwidth of automigration of data based on the control result.

14. The computer program product according to claim 13, wherein the computer readable program causes the computing device to control at least one of start, stop, or bandwidth of automigrating data by determining a bandwidth of the migrating process by defining a number of target systems used in parallel.

15. The computer program product of claim 13, wherein the computer readable program causes the computing device to derive fuzzy variables from values of the configuration parameters by associating ranges of values of the configuration parameters with categories of the fuzzy variables, and wherein the fuzzy function transforms fuzzy variables into a probability for each category in the categories.

16. The computer program product of claim 13, wherein the computer readable program further causes the computing device to:

sense one or more input parameter values using sensors of a throughput monitoring mechanism coupled to an input bus of a source storage system, wherein the one or more input parameter values represent a data throughput of at least one of the source storage system or a target storage system, and wherein the fuzzy variables are further derived based on the one or more input parameter values.

17. The computer program product of claim 13, wherein the computer readable program further causes the computing device to:

determine, based on the one or more input parameter values, whether the automigration of electronic data is to be performed, wherein the computer readable program causes the computing device to perform the read, derive, feed, execute, apply, and control operations in response to a determination that automigration of electronic data is to be performed based on the one or more input parameter values.

18. The computer program product of claim 13, wherein the computer readable program causes the computing device to execute the fuzzy function by executing a plurality of fuzzy functions, each fuzzy function providing a different fuzzy result value, and wherein at least one OR operator is applied to the different fuzzy result values to generate a single fuzzy result that is input to a start/stop trigger function.

19. The computer program product of claim 13, wherein:

a configuration of the automigration controller is stored in a configuration file, the configuration of the automigration controller is for a specific usage scenario, the configuration of the automigration controller configures the logic of the automigration controller to customize the logic for implementing the specific usage scenario, there are a plurality of configuration files for configuring the automigration controller, and a desired configuration file for configuring the logic of the automigration controller is selected for a desired usage scenario.

20. An apparatus, comprising:

an automigration control unit; and a source storage device coupled to the automigration control unit; and a target storage device coupled to the source storage device, wherein the automigration control unit:

reads, into a memory of the automigration control unit, configuration parameters characterizing at least one of hardware or software properties of the source storage device, the target storage device, and a network connection between the source storage device and the target storage device;

derives fuzzy variables from values of the configuration parameters;

feeds a predetermined fuzzy function with the fuzzy variables, wherein the fuzzy function reflects the exhaustion level of the source;

executes the fuzzy function yielding a fuzzy result value;

applies the fuzzy result value to a control scheme, yielding a control result; and control at least one of start, stop, or bandwidth of automigration of data based on the control result.

* * * * *